US012626226B1

(12) United States Patent
Leong

(10) Patent No.: US 12,626,226 B1
(45) Date of Patent: May 12, 2026

(54) IN-PLACE E-MAIL PROCUREMENT AND ARCHIVE SYSTEM

(71) Applicant: ZL Technologies Inc., Milpitas, CA (US)

(72) Inventor: Kon Leong, Reno, NV (US)

(73) Assignee: ZL Technologies Inc., Milpitas, CA (US)

( * ) Notice: Subject to any disclaimer, the term of this patent is extended or adjusted under 35 U.S.C. 154(b) by 0 days.

(21) Appl. No.: 19/264,745

(22) Filed: Jul. 9, 2025

Related U.S. Application Data

(60) Provisional application No. 63/779,635, filed on Mar. 28, 2025.

(51) Int. Cl.
 *G06Q 10/107* (2023.01)
 *H04L 51/42* (2022.01)
(52) U.S. Cl.
 CPC .......... *G06Q 10/107* (2013.01); *H04L 51/42* (2022.05)
(58) Field of Classification Search
 CPC .............................. G06Q 10/107; H04L 51/42
 See application file for complete search history.

(56) References Cited

U.S. PATENT DOCUMENTS

| | | | | |
|---|---|---|---|---|
| 7,593,995 | B1 * | 9/2009 | He ....................... | G06Q 10/107 707/999.005 |
| 8,930,464 | B1 * | 1/2015 | Mace ................... | G06Q 10/107 709/202 |
| 9,171,290 | B1 * | 10/2015 | Croke ............ | G06Q 10/063114 |
| 2012/0109898 | A1 * | 5/2012 | Baessler .............. | G06Q 10/107 707/665 |
| 2024/0259336 | A1 * | 8/2024 | Travis ................... | H04L 51/216 |
| 2025/0233842 | A1 * | 7/2025 | Miller ................. | G06Q 10/107 |

* cited by examiner

*Primary Examiner* — Tony Wu
(74) *Attorney, Agent, or Firm* — Procopio, Cory, Hargreaves & Savitch LLP

(57) ABSTRACT
Systems and methods described herein involve receiving journal copies of the e-mails directed to the enterprise architecture; retrieving message identifiers (IDs) from the journal copies of the e-mails for managing the journal copy in a full text index; and in response to a request to retrieve one or more of the in-place e-mails from the enterprise architecture associated with a message ID: providing the message ID to the API associated with the enterprise architecture to retrieve one or more processing points used by the enterprise architecture to process a journal copy corresponding to the message ID; and providing the retrieved one or more processing points associated with the requested one or more of the in-place e-mails to the API to retrieve the requested one or more of the in-place e-mails from one or more devices storing the one or more of the in-place e-mails.

18 Claims, 16 Drawing Sheets

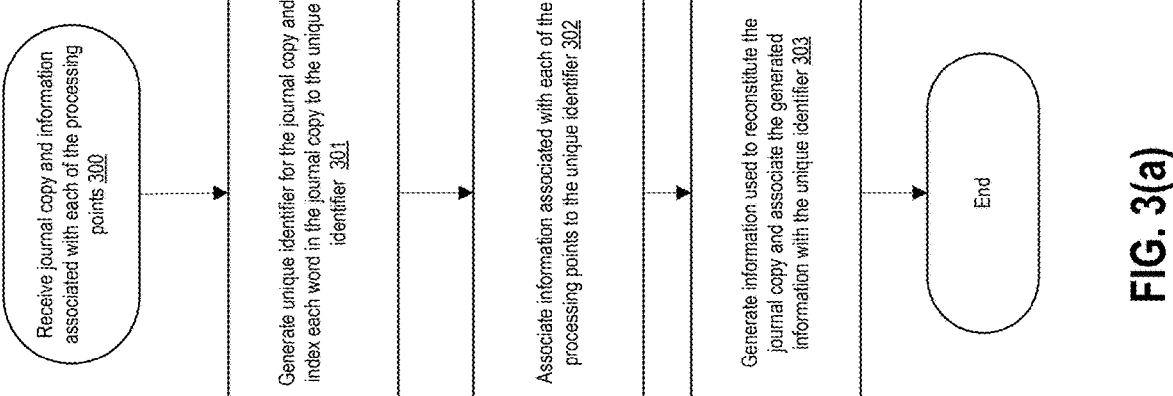

Receive journal copy and information associated with each of the processing points 300

Generate unique identifier for the journal copy and index each word in the journal copy to the unique identifier 301

Associate information associated with each of the processing points to the unique identifier 302

Generate information used to reconstitute the journal copy and associate the generated information with the unique identifier 303

End

FIG. 3(a)

Provide message ID to API to retrieve processing points 311

Receive processing points 312

Provide processing points to API to retrieve underlying in-place e-mail 313

Receive in-place e-mails corresponding to the message ID 314

End

FIG. 4(c)

Reconstitution index

| Journal ID | Reconstitution info |
|---|---|
| J1 | R1 |
| J2 | R2 |
| J3 | R3 |
| •• | •• |

FIG. 4(a)

Full Text Index

| Word | Journal IDs |
|---|---|
| ABLE | J1, J2, J3, ···. |
| BAKER | J2, J4, ··· . |
| CHARLIE | J1, J3, ... |
| •• | •• |

FIG. 4(b)

Processing Point index

| Journal ID | Processing points |
|---|---|
| J1 | D1, D4, D8, .... |
| J2 | D2, D4, ··· . |
| J3 | D1, D3, ···. |
| •• | •• |

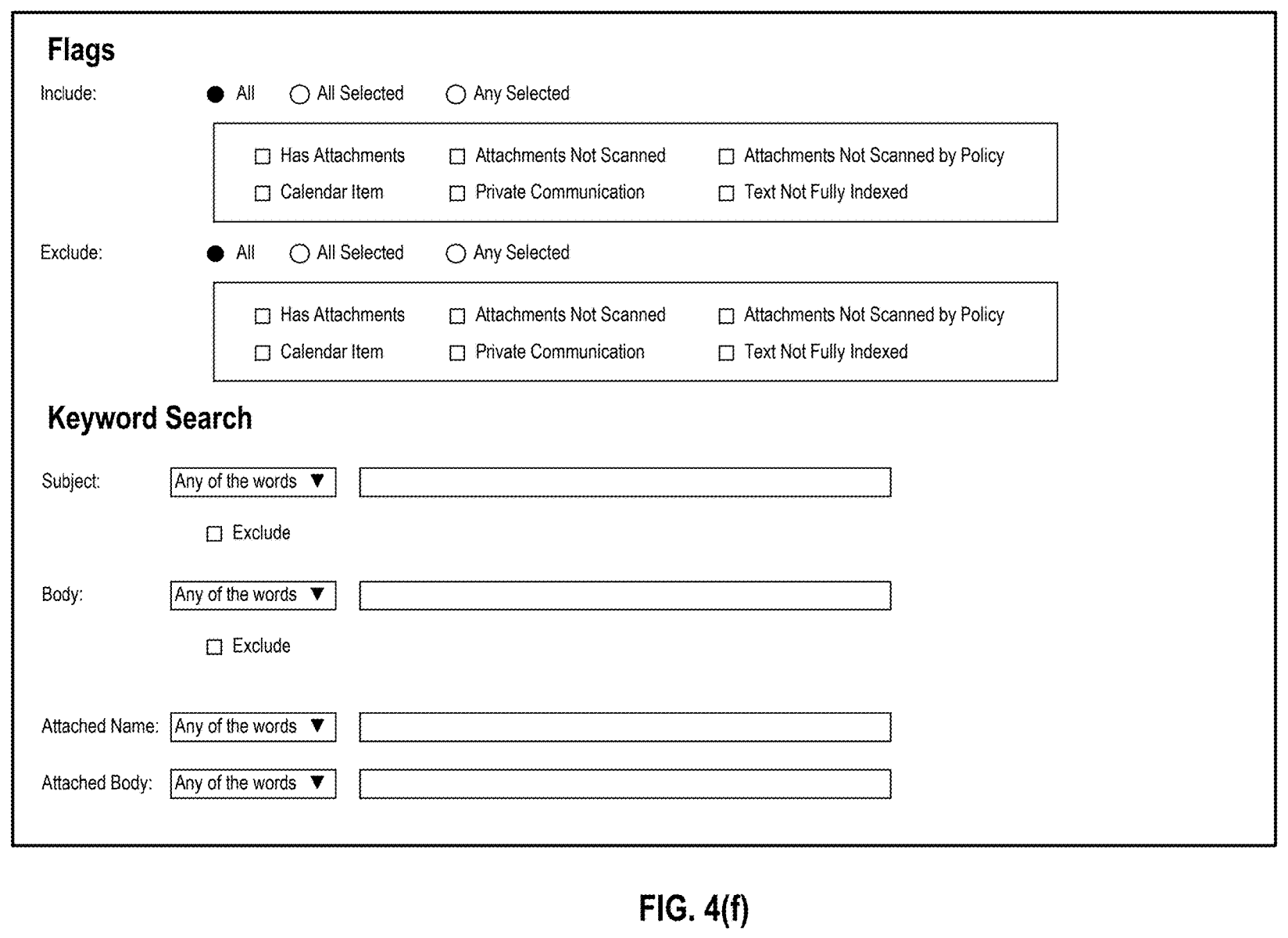

Flags

Include:
● All     ○ All Selected     ○ Any Selected

☐ Has Attachments      ☐ Attachments Not Scanned      ☐ Attachments Not Scanned by Policy
☐ Calendar Item        ☐ Private Communication         ☐ Text Not Fully Indexed Exclude:
● All     ○ All Selected     ○ Any Selected ☐ Has Attachments      ☐ Attachments Not Scanned      ☐ Attachments Not Scanned by Policy
☐ Calendar Item        ☐ Private Communication         ☐ Text Not Fully Indexed

Keyword Search

Subject:        Any of the words ▶

☐ Exclude

Body:           Any of the words ▶

☐ Exclude

Attached Name:  Any of the words ▶

Attached Body:  Any of the words ▶

FIG. 4(f)

Manage Workspaces / Search History

New_Mails_Workspace

Need help? Click for more context on this page.

Last Updated: Apr 24 2025 04:25:14 ● Workspace Update

+ Add Data

| Actions | Search Name | Last Updated | Last Exported | Hit Count | Date Performed |
|---|---|---|---|---|---|
|  | New_Mails_Workspace_default | Apr 24 2025 04:24:41 pm | Not Exported | 975 | Apr 24 2025 04:24:35 pm |

FIG. 4(j)

Manage Workspaces

New_Mails_Workspace ✎

Need help? Click for more context on this page. Ⓢ ⦚⦚⦚

Search: New_Mails_Workspace_default ▼

Preservation Summary: New_Mails_Workspace_default

| Status | Count |
|---|---|
| Not yet Processed | 0 |
| Staged | 0 |
| Archived | 1000 |
| Preserved | 0 |
| Deleted in source | 0 |
| Error downloading | 0 |

Retry ↻

FIG. 4(m)

IN-PLACE E-MAIL PROCUREMENT AND ARCHIVE SYSTEM

CROSS REFERENCE TO RELATED APPLICATIONS

This U.S. patent application is based on and claims the benefit of domestic priority under 35 U.S.C 119(e) from provisional U.S. patent application No. 63/779,635, filed on Mar. 28, 2025, the disclosure of which is hereby incorporated by reference herein in its entirety.

BACKGROUND

Field

The present disclosure is generally directed to electronic mail archiving systems, and more specifically, to an in-place e-mail procurement and archive system.

Related Art

Electronic mail (e-mail) communications are commonplace for any business. To facilitate receipt, processing, archiving, and delivery of e-mails, many businesses utilize an enterprise architecture involving a set of solutions, such as a client interface or software for e-mail management and archiving for each user/recipient, servers implementing the backbone of the enterprise solution for e-mails to handle receipt and delivery of e-mails, storage systems to facilitate archiving of e-mails, and other tools or solutions that are attached to or associated with the client interface or software for the user.

To comply with business regulations, records management, or information governance such as discovery compliance, the implemented enterprise architecture also needs to archive such e-mails for at least a certain period of time. Such enterprise architectures can utilize an archival system that clones received e-mails and documents and manage them in one or more storage systems. In some instances, such archived e-mails may be used by the business to conduct data analytics using data analytics tools as desired.

SUMMARY

There are several issues with related art enterprise architectures used to manage e-mails. In a first issue, as a business grows and hires more employees, the amount of e-mail received by the business can grow exponentially. A business having only a few hundred users can receive or send a large volume of e-mail (e.g., billions) over the course of only a few years. The costs to archive such e-mails, even if only for a limited amount of time, can therefore grow exponentially as increased storage becomes required.

In another related art issue, enterprise architectures utilized for e-mail management have little to no cross-enterprise compatibility for access or manipulation due issues such as vendor lock-in. Such enterprise architectures can be quite siloed, causing issues with the ability to conduct analytics, or facilitating procurement of e-mails to a third party without utilizing the enterprise architecture of the business. In situations for which e-mails need to be procured quickly for regulatory compliance, the business typically has no choice but to use crawling tools within the enterprise architecture to search and procure the e-mail from the archive. However, as the amount of e-mails managed by the business can be inordinately large (e.g., billions), such tools require a large amount of time and compute to crawl the archive and procure the requested e-mail from archives, or from the storage systems facilitating the user client interfaces or software.

To address the issues of the related art, example implementations described herein are directed to an in-place e-mail procurement and archival system. The system in the example implementations take advantage of both the journal copy that is received by the enterprise architecture before processing, as well as information generated at each processing point of the enterprise architecture before delivery to the end user to generate a full text index of all e-mails received by the enterprise architecture implemented by the business to remove the need to clone all e-mails received by each end user, thereby massively reducing storage costs as e-mails sent to the end user can be stored in-place instead of requiring a clone copy. The full text index of the e-mails is also stored with information generated from each processing point of the enterprise architecture that occurs between receipt of the journal copy to the final delivery of the e-mail to the end user, which facilitates the functionality to reconstitute any e-mail from the perspective of the end user, thereby facilitating archiving of e-mails while allowing the business to manage e-mails in-place without requiring a clone copy of each e-mail received by the end user. Such an example implementation also obviates the need to crawl all of the e-mails managed by the enterprise system, therefore reducing the time and compute required to procure e-mails for regulatory compliance.

Further, because a full-text index is maintained in the archival system, data analytics can be conducted on the text managed by the archive from cross enterprise solutions, thereby avoiding the need to utilize the same enterprise architecture implemented by the business to conduct analytics, search, or procurement and essentially bypass the enterprise architecture. As the archive is a full-text index, analytics can be conducted significantly faster on the e-mails received by the business than through utilizing analytics tools to traverse through the stored e-mails in the enterprise architecture.

Aspects of the present disclosure can involve an archive system that receives a journal copy of an e-mail directed to an enterprise architecture and manages a full text index of the journal copy; and information associated with processing points of the enterprise architecture that process the journal copy to generate the e-mail to be directed to the end user.

Aspects of the present disclosure can include a method for an archive system for managing an archive of e-mails as in-place e-mails in an enterprise architecture and facilitating retrieval of the in-place e-mails, which can involve receiving journal copies of the e-mails directed to the enterprise architecture; retrieving message identifier (IDs) from the journal copies of the e-mails for managing the journal copies in a full text index; and in response to a request to retrieve one or more of the in-place e-mails from the enterprise architecture associated with the message ID from the message IDs, providing the message ID to an application programming interface (API) associated with the enterprise architecture to retrieve one or more processing points used by the enterprise architecture to process the journal copy; and providing the retrieved one or more processing points associated with the requested one or more of the in-place e-mails to the API to retrieve the requested one or more of the in-place e-mails from one or more devices storing the one or more of the in-place e-mails.

Aspects of the present disclosure can include an archive system configured to manage an archive of e-mails as in-place e-mails in an enterprise architecture and facilitating retrieval of the in-place e-mails, which can include a storage system; and a server connected to the storage system by a network, the server including a processor, configured to receive journal copies of e-mails directed to the enterprise architecture; retrieve message identifier (IDs) from the journal copies of the e-mails for managing in a full text index managed by the storage system; and in response to a request to retrieve one or more of the in-place e-mails from the enterprise architecture associated with the message ID, provide the message ID to an application programming interface (API) associated with the enterprise architecture to retrieve one or more processing points used by the enterprise architecture to process the journal copy; and provide the retrieved one or more processing points associated with the requested one or more of the in-place e-mails to the API to retrieve the requested one or more of the in-place e-mails from one or more devices storing the one or more of the in-place e-mails.

Aspects of the present disclosure can include a computer program for an archive system for managing an archive of e-mails as in-place e-mails in an enterprise architecture and facilitating retrieval of the in-place e-mails, which can involve instructions including receiving a journal copy of an e-mail directed to the enterprise architecture; retrieving a message identifier (ID) from the journal copy of the e-mail for managing the journal copy in a full text index; and in response to a request to retrieve one or more of the in-place e-mails from the enterprise architecture associated with the message ID, providing the message ID to an application programming interface (API) associated with the enterprise architecture to retrieve one or more processing points used by the enterprise architecture to process the journal copy; and providing the retrieved one or more processing points associated with the requested one or more of the in-place e-mails to the API to retrieve the requested one or more of the in-place e-mails from one or more devices storing the one or more of the in-place e-mails. The computer program and instructions can be stored on a non-transitory computer readable medium and executed by one or more processors.

Aspects of the present disclosure can include an archive system for managing an archive of e-mails as in-place e-mails in an enterprise architecture and facilitating retrieval of the in-place e-mails, which can involve means for receiving a journal copy of an e-mail directed to the enterprise architecture; means for retrieving a message identifier (ID) from the journal copy of the e-mail for managing the journal copy in a full text index; and in response to a request to retrieve one or more of the in-place e-mails from the enterprise architecture associated with the message ID, means for providing the message ID to an application programming interface (API) associated with the enterprise architecture to retrieve one or more processing points used by the enterprise architecture to process the journal copy; and means for providing the retrieved one or more processing points associated with the requested one or more of the in-place e-mails to the API to retrieve the requested one or more of the in-place e-mails from one or more devices storing the one or more of the in-place e-mails.

BRIEF DESCRIPTION OF DRAWINGS

FIG. 3(a) illustrates an example flow for creating the in-place e-mail procurement and archive system, in accordance with an example implementation.

FIGS. 4(a) to 4(c) illustrate example management information managed by the archive system for archiving the journal copy, in accordance with an example implementation.

FIGS. 4(d) to 4(m) illustrate examples of user interfaces for facilitating the in-place e-mail archive system and retrieval of in-place e-mails, in accordance with an example implementation.

DETAILED DESCRIPTION

Figure 1:
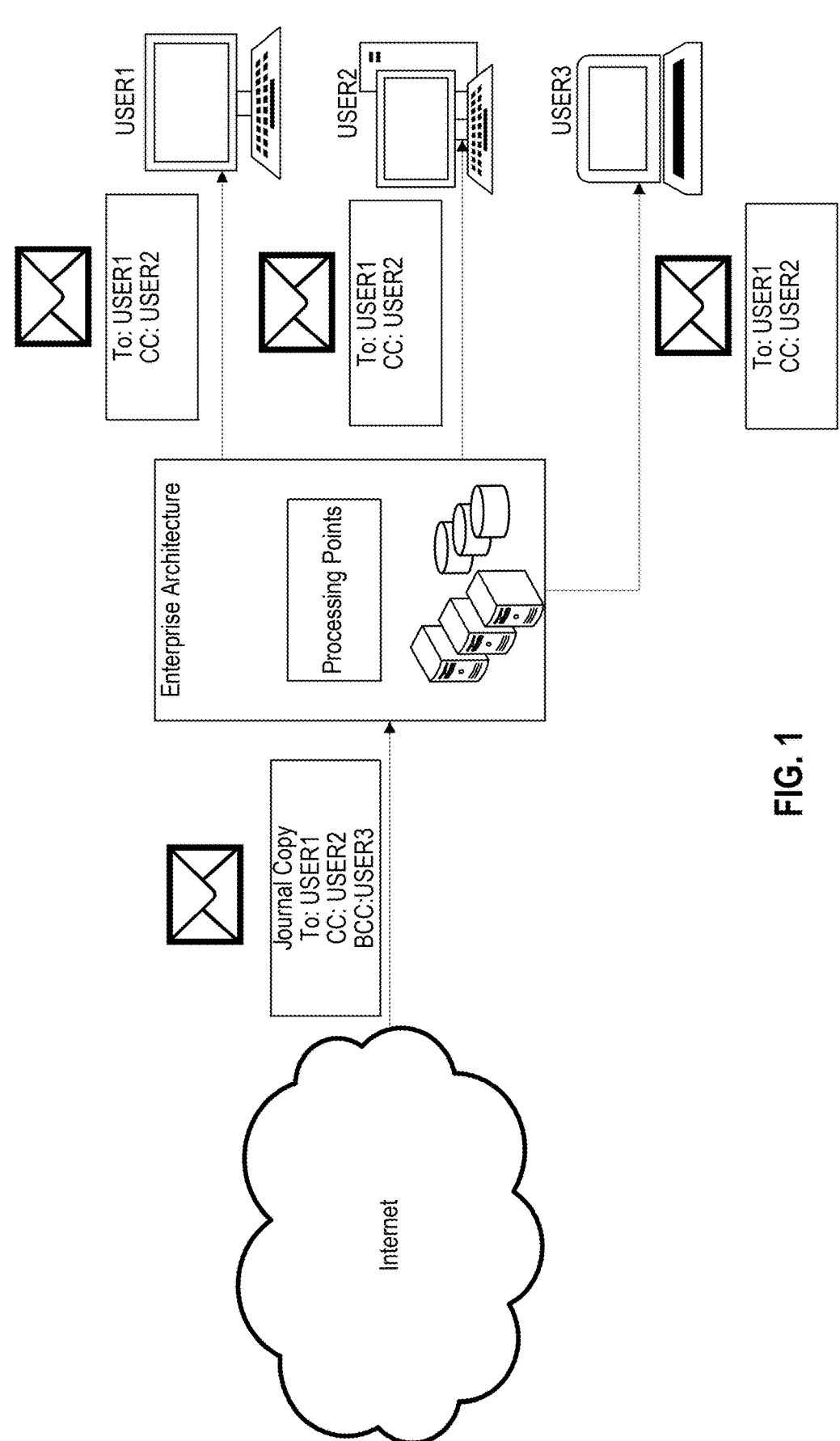
FIG. 1 illustrates an example enterprise architecture configured to manage e-mails for users, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means or can be implemented through a desired algorithm. Example implementations as described herein can be utilized either singularly or in combination and the functionality of the example implementations can be implemented through any means according to the desired implementations.

FIG. 1 illustrates an example enterprise architecture configured to manage e-mails for users, in accordance with an example implementation. In an example implementation, an e-mail may be transmitted from the internet to the enterprise architecture implemented by the business. The enterprise architecture can involve one or more servers to receive and process the e-mail. The initial e-mail received by the enterprise architecture is known as the journal copy, which is sent and received in the MIME protocol as a standard to facilitate transmission to and from the internet between source and destination.

The enterprise architecture receives the journal copy and conducts processing to determine the end user destination. Depending on the underlying client utilized in the enterprise architecture, the journal copy is processed to determine the end user, generate the e-mail to be delivered to the end user in the format to comply with the underlying e-mail client interface, and send the e-mail to the end user. The journal copy is then discarded once processing is complete.

In the example illustrated in FIG. 1, the journal copy received by the enterprise architecture has three types of end user recipients, the direct recipient (indicated in the To: field), the carbon copy recipient (indicated in the CC: field), and the blind carbon copy recipient (indicated in the BCC: field). The e-mail generated for each end user may be different depending on the enterprise architecture. For example, the direct recipient and the carbon copy recipient will be unaware that there is a blind carbon copy recipient, as such information will be removed when generating the e-mail directed to the recipients. Further, the blind carbon copy recipient will also receive an e-mail generated for them, however, typically nothing in the generated e-mail will indicate that it is a blind carbon copy. In the example of FIG. 1, the processing points include generation of the e-mail for each user, transmitting the e-mail to the appropriate server (if necessary) to effect delivery of the e-mail to the end user, and transmitting the e-mail to the appropriate virtualized storage space facilitating the user e-mail client interface or software, or to the user device.

Depending on the implementation of the enterprise architecture, the e-mails may be stored locally on the user device facilitating the e-mail client interface or software of the user, or it may be stored in a storage system facilitating dedicated virtualized storage space for each end user in the business for access by the user. This e-mail is referred to herein as the folder copy, which is managed in-place by the user at the end user device or at the dedicated virtualized storage space.

To facilitate analytics or regulatory compliance, in the related art, the folder copy may be cloned to a storage system for archival purposes. As the volume of e-mails may be overly large, a database involving metadata of the e-mails may be utilized as an index to index the e-mails cloned in the archive.

Figure 2:
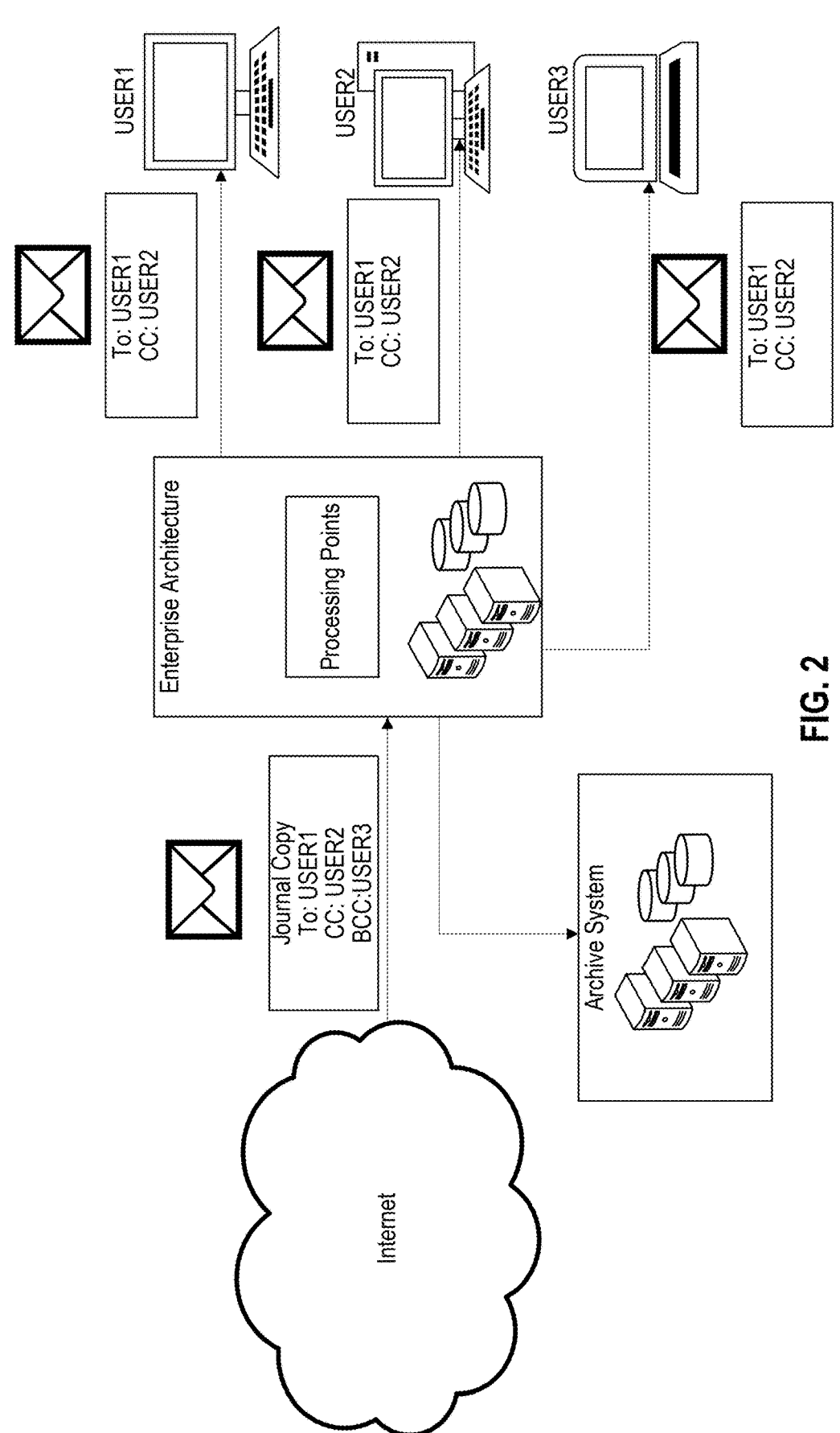
FIG. 2 illustrates an example of the in-place e-mail procurement and archive system, in accordance with an example implementation.

FIG. 2 illustrates an example of the in-place e-mail procurement and archive system, in accordance with an example implementation. In the example implementation described herein, the journal copy received at the enterprise architecture is also forwarded to the proposed in-place e-mail procurement and archive system. The journal copy is then processed to generate a full text index of all contents in the journal copy. Each word in the journal copy is associated with an index for later retrieval as will be described herein. Information is extracted at each processing point to trace the history from receipt of the journal copy, to the generation of the e-mail for the end user recipient, to the delivery of the e-mail to the end user recipient, which is used for processing the journal copy. The processing points can be managed by an application programming interface (API) at the enterprise architecture.

Figure 3B:
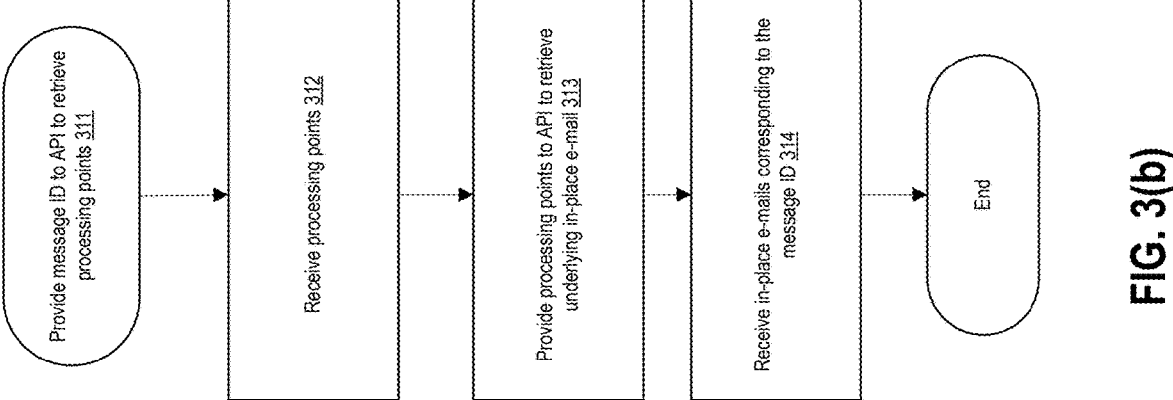
FIG. 3(b) illustrates an example flow for retrieving the in-place e-mail, in accordance with an example implementation.
Figure 4D:
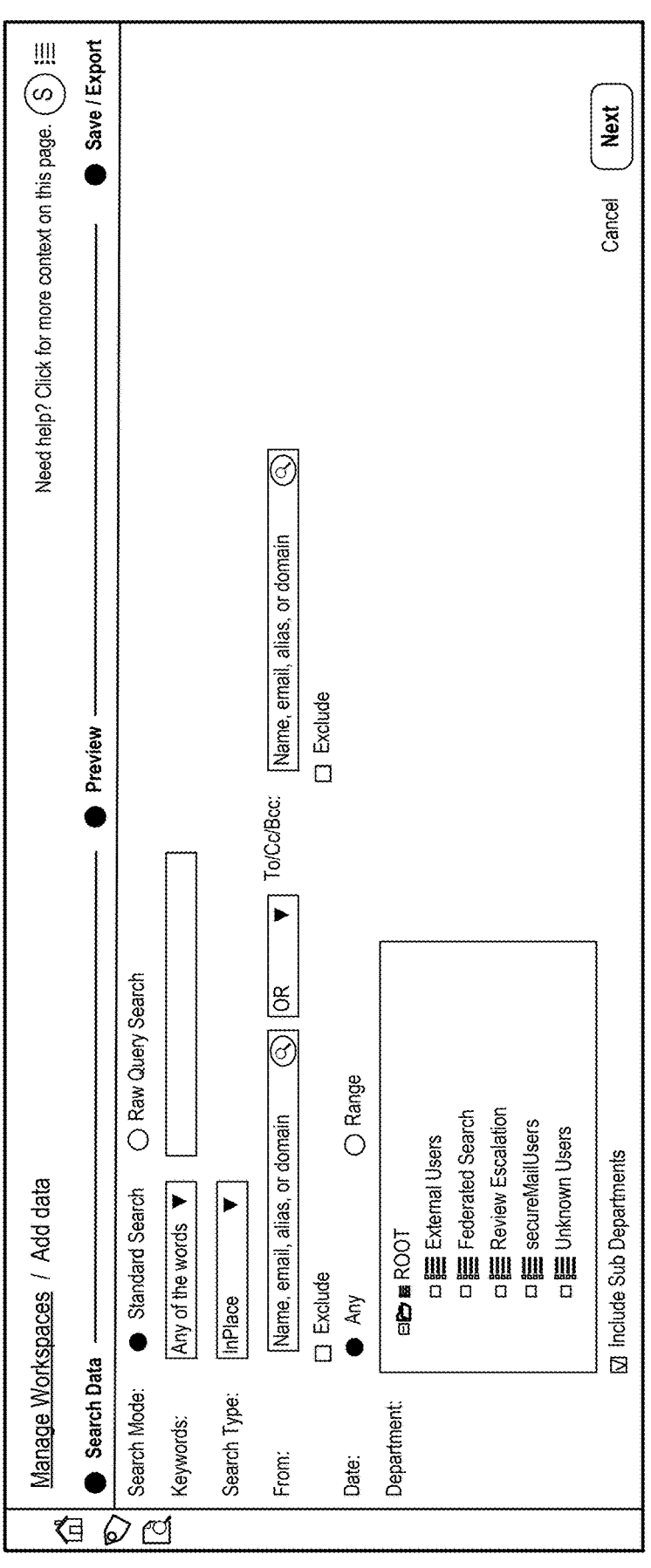
Figure 4E:
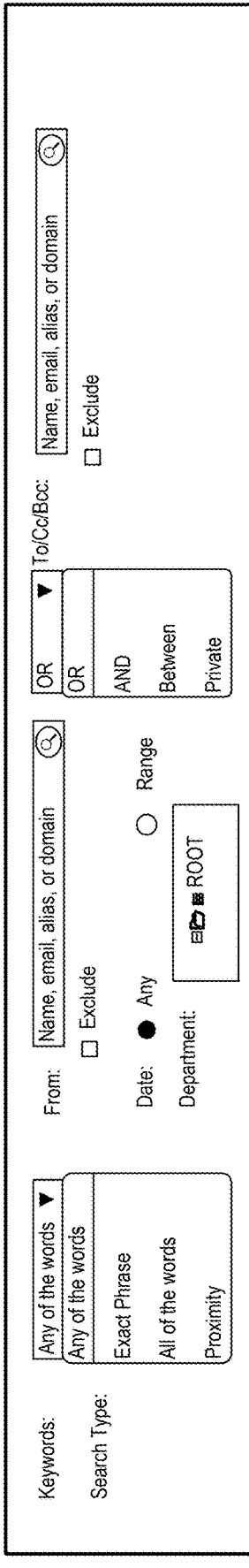
Figure 4G:
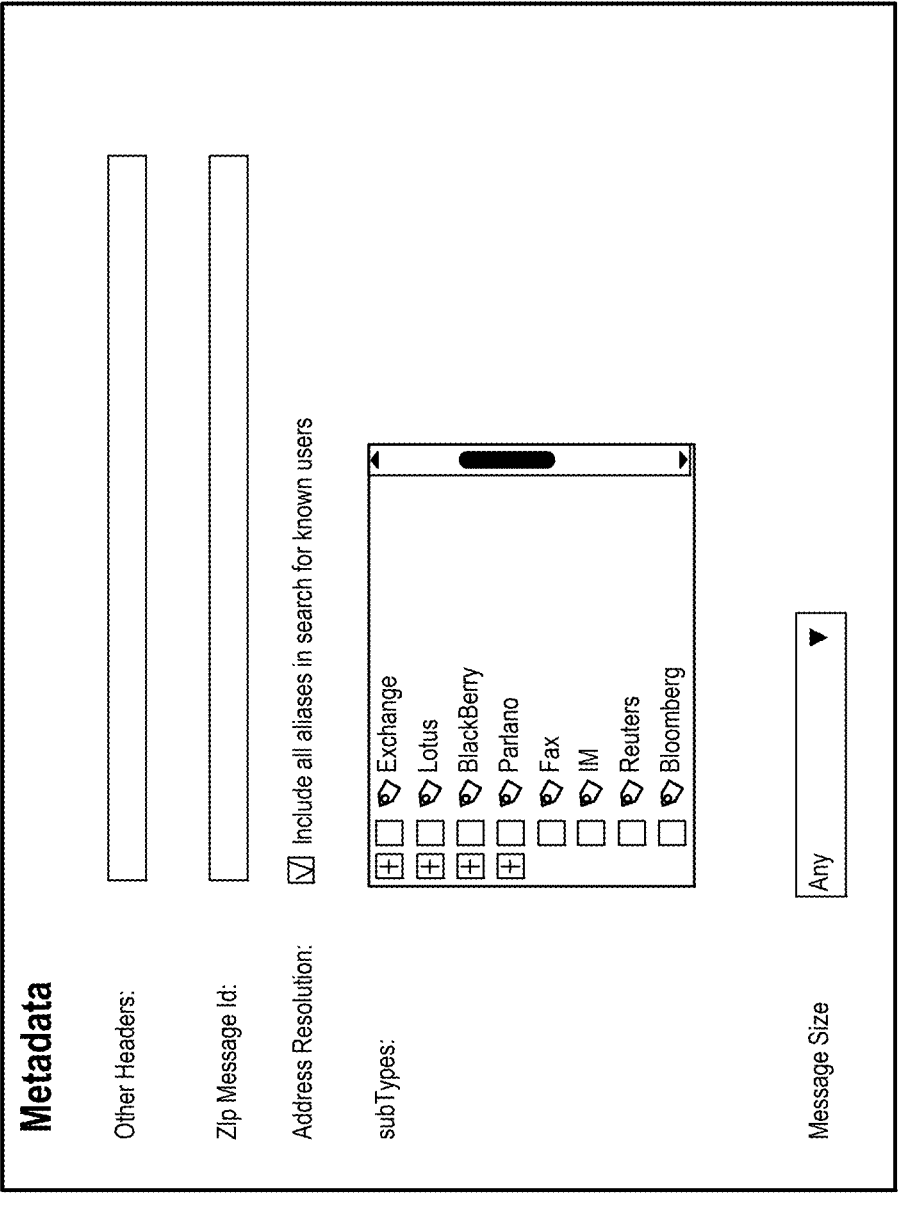
Figure 4H:
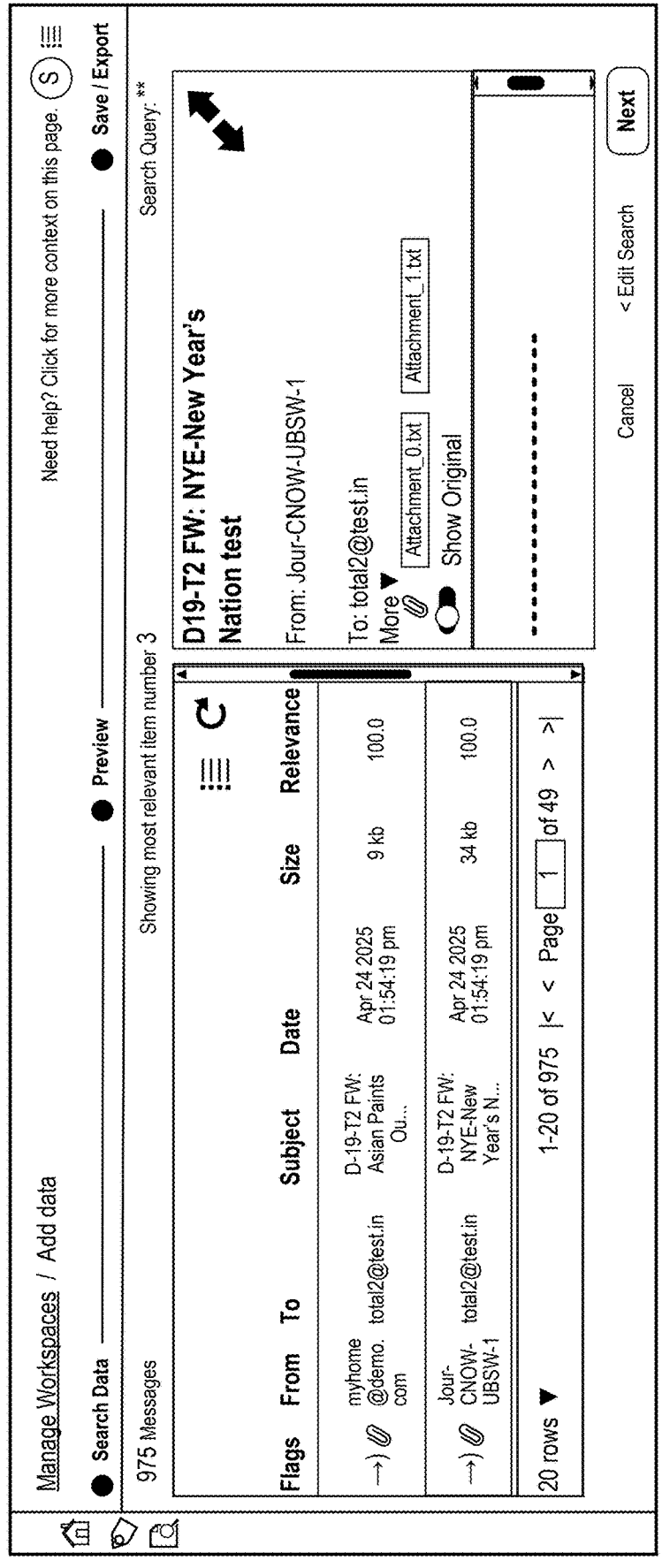
Figure 4I:
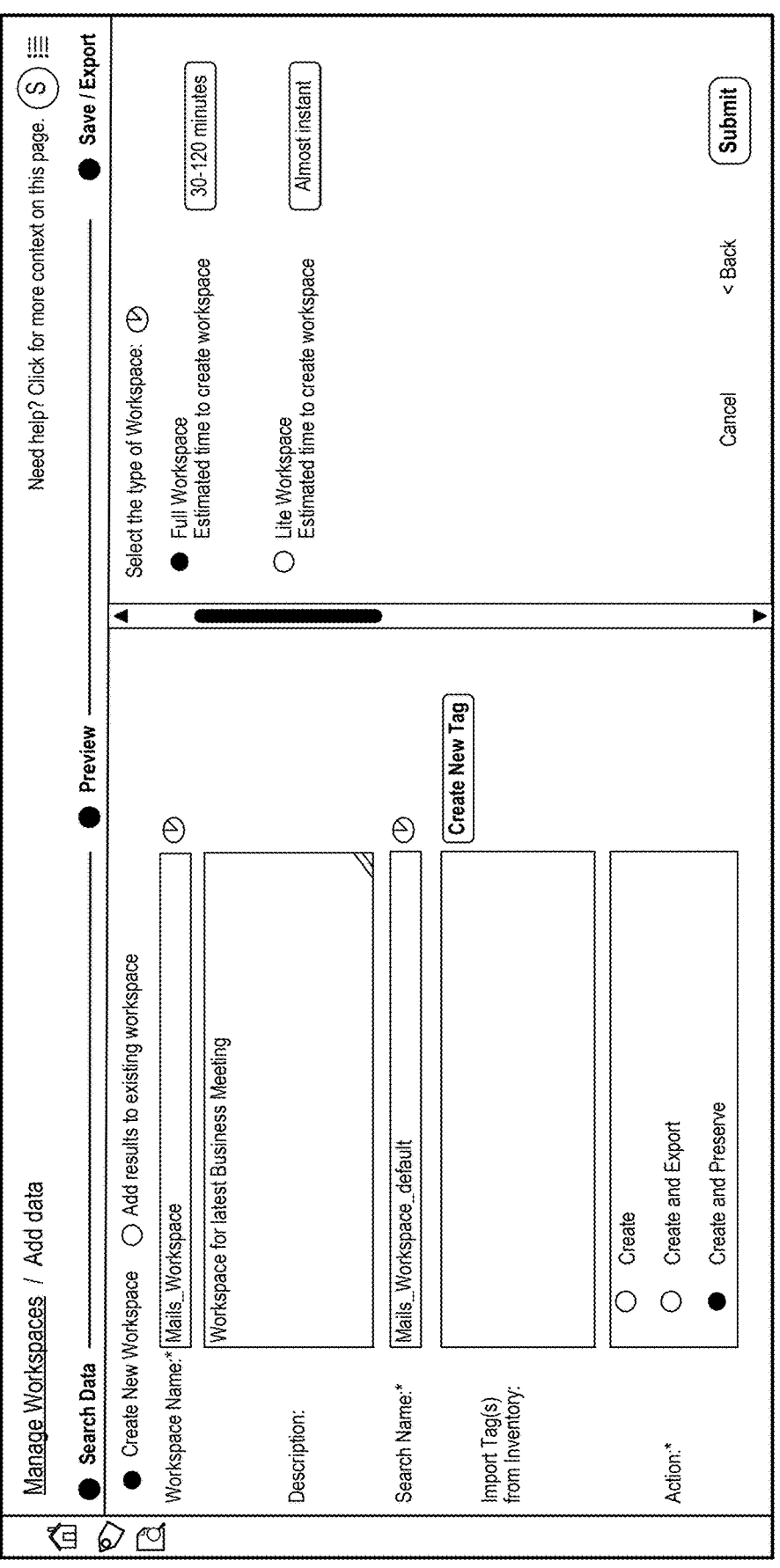
Figure 4K:
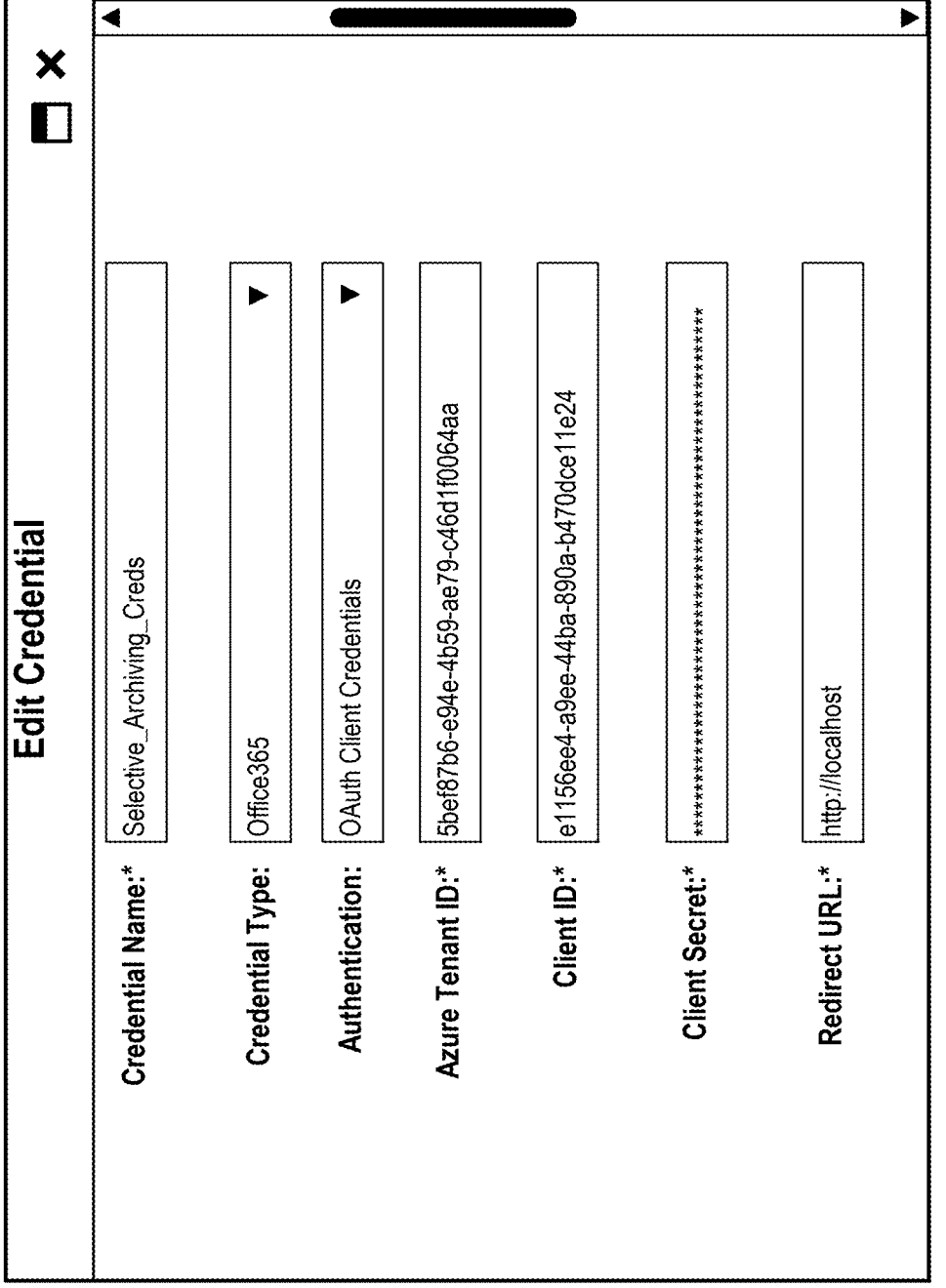
Figure 4I:
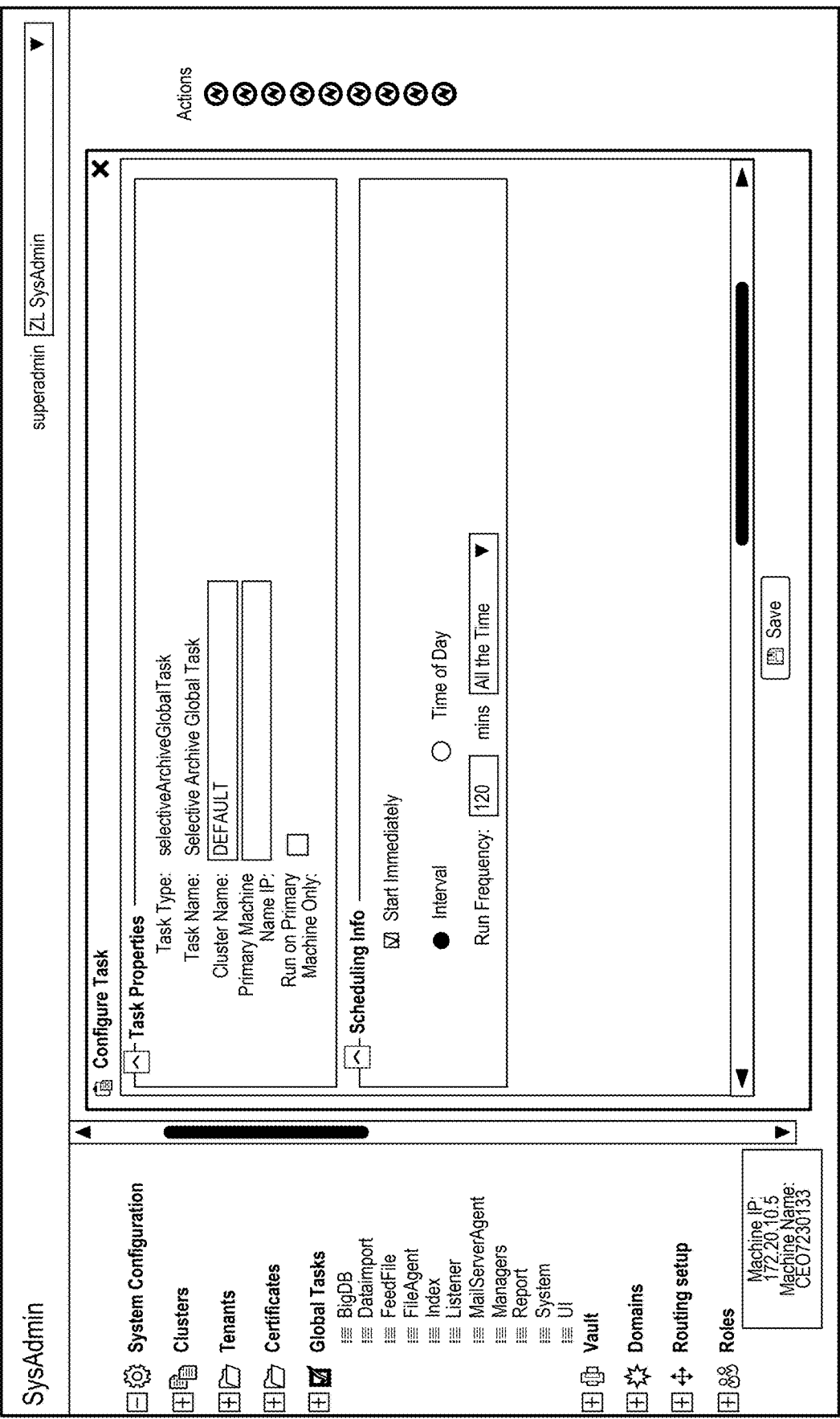

FIG. 3(*a*) illustrates an example flow for creating the in-place e-mail procurement and archive system, in accordance with an example implementation. At 300, the archive system receives the journal copy. At 301, the archive system generates a unique identifier for the journal copy and associates the unique identifier to each word in the journal copy for indexing in the full text index. In example implementations described herein, the unique identifier can be generated based off the message identifier (ID) of the journal copy, or the message ID can be specifically extracted from the journal ID to server as the unique identifier. At 302, the archive system generates information used to reconstitute the journal copy and associates it with the unique identifier. At 303, the journal copy is then deleted by the archive system. In most implementations of the enterprise architecture, due to the burden of storing large volumes of e-mails the enterprise architecture also deletes the journal copy once it is processed.

FIG. 3(*b*) illustrates an example flow for retrieving the in-place e-mail, in accordance with an example implementation. To facilitate this functionality, the API of the enterprise architecture is configured to associate the message ID of the journal copy to the processing points used to generate and deliver the e-mail to the underlying user. At 311 a message ID is provided to the API with a request to obtain the processing points. Each enterprise architecture has their own version of the processing points, and may have different terminology depending on the architecture used. For example, graph ID is a term that is utilized by several such enterprise architectures, and some of the enterprise architectures may have a built in or configurable API known as a graph API that is configured to retrieve such processing points.

At 312, the API returns the processing points to the archive system. Depending on the desired implementation, the archive system can then provide a user interface to facilitate a selection of the pertinent underlying e-mails for selection. Once such a selection is made, at 313 the archive system provides the corresponding processing points along with a request to retrieve the underlying e-mail associated with the corresponding processing points to the API. At 314, the API traverses the provided processing points to obtain the underlying e-mail from the user device and provides the e-mail to the archive system.

FIGS. 4(*a*) to 4(*c*) illustrate example management information managed by the archive system for archiving the journal copy, in accordance with an example implementation. Specifically, FIG. 4(*a*) illustrates an example full text index, in accordance with an example implementation. The full text index is an index of all words processed by the archive system, and the unique identifiers of processed journal copies that had the word. FIG. 4(*b*) illustrates an example table for managing association of the information associated with each of the processing points to the unique identifiers in accordance with an example implementation. FIG. 4(*c*) illustrates an example table for managing association of generated information used to reconstitute the journal copy from the full text index, which can be utilized by one or more algorithms to reconstitute the journal copy.

FIGS. 4(*d*) to 4(*m*) illustrate examples of user interfaces for facilitating the in-place e-mail archive system and retrieval of in-place e-mails, in accordance with a desired implementation. Now, there are lot of options incorporated for efficient search purposes as shown in the below image. As shown in FIG. 4(*d*), a user interface is provided that is configured to execute an in-place e-mail search. The search can be executed using various fields, such as keyword, from/to/carbon copy/blind carbon copy field, date, or department. FIG. 4(*e*) illustrates an example user interface to with an expansion of the drop down boxes of FIG. 4(*d*), in accordance with an example implementation. Keyword search portrays multiple options to search based on the exact phrase present in the e-mail content, based on all the words and proximity of the words.

FIGS. 4(*f*) and 4(*f*) illustrate example of user interfaces to search by keywords, or flags, and to filter e-mails by specifying either the sender or receiver or both. In example implementations, the user can also filter the e-mails based on the date or date ranges, or departments. More options can include, but are not limited to, attachments, metadata, and so on to facilitate enhanced search and filtering options that may be used in complex eDiscovery requirements.

FIG. 4(*h*) illustrates an example of a user interface to illustrate search results of the in-place e-mails. Specifically, FIG. 4(*h*) illustrates the search results for in response to to a search request made according to the provided search criteria. In this example implementation, the search result provides a preview for creating of a workspace to retrieve e-mails, but can also provide some or all of the full text of the e-mails as well in accordance with the desired implementation.

FIGS. 4(*i*) and 4(*j*) illustrate examples of user interfaces to create workspaces for the in-place e-mails, in accordance with an example implementation. In example implementations described herein, the user can provide details for creating a workspace to retrieve the in-place e-mails, such as the name and description, or the retrieved in-place e-mails can also be provided to an existing workspace. Other options, such as the create and preserve option are also available.

FIG. 4(*k*) illustrates an example of a user interface to facilitate permissions to access the in-place e-mails, in accordance with an example implementation. As the in-place e-mails are stored either directly on user devices or on virtualized spaces created by e-mail applications of the enterprise architecture to maintain user e-mails and addresses, credentials with sufficient permissions must be provided to fetch the e-mails from the source.

FIGS. 4(*l*) and 4(*m*) illustrate examples of user interfaces to execute a global task to selectively archive in-place e-mails from the search results, in accordance with an example implementation. In this example, once the workspace is created, it can be opened for selection of the preservation summary option to indicate the progress of the e-mails as to whether they were successfully archived, staged, preserved, deleted or faced any error while archiving. In the above image, the 1000 e-mails from the search results were successfully archived. Through the user interfaces described herein, it is thereby possible to search for in-place e-mails from utilizing the full text index, and then retrieving the in-place e-mails when requested for selective archiving. Such example implementations therefore allow the e-mails of the enterprise architecture to be maintained and searchable in-place and only retrieved when required, thereby saving on storage and processing resources in comparison to creating a duplicate archive of the e-mails and attempting to search the e-mails through the enterprise architecture system.

Because all of the text in the journal copy is fully indexed, search and retrieval of the e-mails can be done significantly faster than using the internal search function of the enterprise architecture to crawl through all stored e-mails in the enterprise architecture. This allows users to bypass the enterprise architecture in response to requests for e-mail retrieval from regulatory agencies or for e-discovery compliance. Further, the full text index can be traversed for data analytics purposes if necessary.

Additionally, because all of the text in the journal copy is fully indexed, the actual e-mails delivered to the end users can be maintained in-place as opposed to storing a clone copy within the enterprise architecture for regulatory purposes. Such example implementations can greatly reduce storage costs for the business as a backup storage system is therefore not required.

To reconstitute the journal copy in response to a query, the archive system is configured to extract all words associated with a particular unique identifier, and then utilize the generated information for reconstituting the journal copy to reconstitute the journal copy. One or more algorithms configured to reconstitute the journal copy based on the generated information can be used, which can be any type of text recovery algorithm in accordance with the desired implementation. In another example implementation, the generated information may not be necessary for certain types of text recovery algorithms that do not require such information, such as machine learning based algorithms.

Further, as information associated with the processing points for the journal copy are also indexed and retained, such information can be utilized to generate a mock copy of the e-mail as received by each of the end user(s). To generate the mock copy of the e-mail as received by the each of the end user(s) the reconstituted journal copy is then processed through mock execution of the processing points based on the information associated with the processing points to generate a mock copy of how the e-mail appears to each end user recipient. The mock copy can then be provided for regulatory compliance purposes. In the event that the original e-mail is required, such e-mails can be easily provided by the business through the enterprise architecture, as the underlying end user(s) and the e-mail contents are known.

Figure 5:
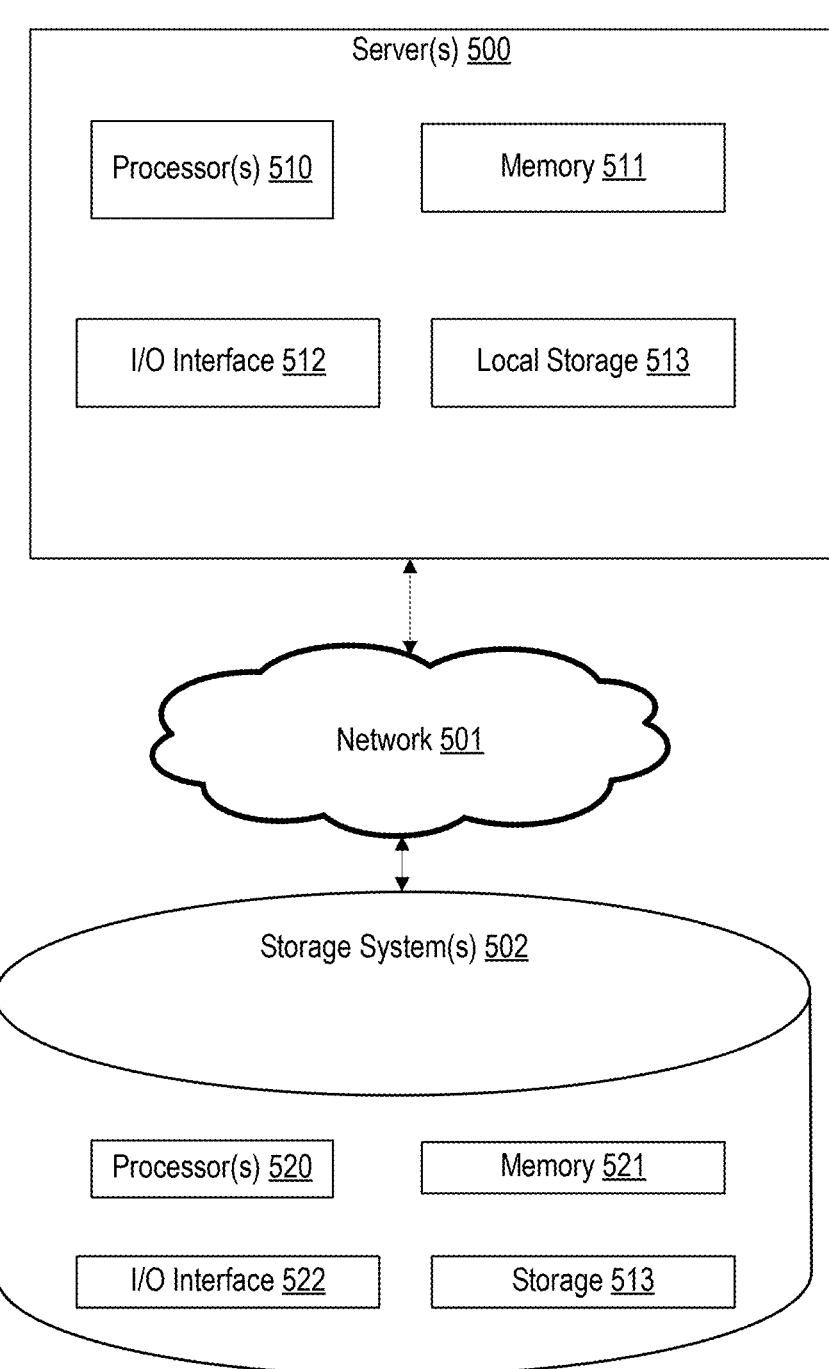
FIG. 5 illustrates an example system upon which the archival system can be applied.

FIG. 5 illustrates an example system upon which the archival system can be applied. The example system can include one or more servers 500 that are connected to one or more storage systems 502 over a network 501. The one or more servers 500 are configured to receive the journal copy and the information associated with each processing point used to process the journal copy, and process the journal copy for storage into the management information illustrated in FIGS. 4(*a*) to 4(*c*) through execution of the flow diagram illustrated in FIG. 3. The one or more servers 500 can be configured to receive a query for retrieval of an e-mail (e.g., by word contents, by user, by timestamp, etc.) and then process the query to retrieve such information from the storage system.

Each of the one or more servers can involve one or more processor(s) 510, memory 511, Input/Output (I/O) interface 512 and local storage 513. The one or more processor(s) 510 can be implemented through use of any hardware processor, or any combination of hardware and software processors, such as a central processing unit (CPU), graphics processing unit (GPU), tensor units, and so on in accordance with the desired implementation. Memory 511 can involve local access memory such as Read Only Memory (ROM), Random Access Memory (RAM), and so on to facilitate desired functionality for the one or more servers. Input/Output (I/O) interface 512 is used to interface the one or more servers 500 with the internet or other network connecting the archive system to the enterprise architecture, as well as to interface the one or more servers 500 to the one or more storage systems 502 over the network 501. Local storage 513 can involve flash memory, hard disk drives, or other types of non-transitory storage to facilitate various software functionality to the one or more servers 500. In an example, software stored in local storage 513 to facilitate the functionality of executing the functions outlined in FIG. 3 can be loaded into memory 511 to be executed by the one or more processor(s) 510. In example implementations as described herein, some of the management information described in FIGS. 4(*a*) to 4(*c*) may be stored in local storage 513 at first to be subsequently destaged at a later point in time to the one or more storage systems 502.

Network 501 can be in the form of any network utilized to facilitate connectivity, such as a storage area network (SAN), local area network (LAN), a wide area network (WAN), and so on, depending on the desired implementation.

Each of the one or more storage systems can involve one or more processor(s) 520, memory 521, I/O interface 522, and storage 523. The one or more processor(s) 520 can be implemented through use of any hardware processor, or any combination of hardware and software processors, such as a central processing unit (CPU), graphics processing unit (GPU), tensor units, and so on in accordance with the desired implementation. Memory 521 can involve local access memory such as Read Only Memory (ROM), Random Access Memory (RAM), and so on to facilitate desired functionality for the one or more storage systems. Input/ Output (I/O) interface 522 is used to interface the one or more storage systems 502 with the one or more servers 500 to over the network 501. Storage 523 can involve any storage architecture to facilitate storage for the storage system, including solid state drives (SSD), hard disk drives, and so on in accordance with the desired implementation. Storage 523 can be configured to store some or all of the management information as illustrated in FIGS. 4(*a*) to 4(*c*) to facilitate the functionality described herein.

Processor(s) 520 can be configured to facilitate functionality of an archive system configured to manage an archive of e-mails as in-place e-mails in an enterprise architecture and facilitating retrieval of the in-place e-mails, and can be configured execute a method or computer instructions so as to receive journal copies of the e-mails directed to the enterprise architecture; retrieve message identifiers (IDs) from the journal copies of the e-mails for management in a full text index managed by the storage system; and in response to a request to retrieve one or more of the in-place e-mails from the enterprise architecture associated with a message ID from the message IDs, provide the message ID to an application programming interface (API) associated with the enterprise architecture to retrieve one or more processing points used by the enterprise architecture to process a journal copy from the journal copies corresponding to the message ID; and provide the retrieved one or more processing points associated with the requested one or more of the in-place e-mails to the API to retrieve the requested one or more of the in-place e-mails from one or more devices storing the one or more of the in-place e-mails.

As shown in FIG. 2, the one or more devices can include one or more user devices that manages the one or more of the in-place e-mails. Depending on the desired implementations, the one or more user devices can further include mail servers or other enterprise servers facilitating e-mail functionality and storage for one or more users in a virtualized system.

Processor(s) 520 can be configured to execute the methods or computer instructions as described herein, and be further configured to execute a method or instructions so as to generate the full text index of the journal copies with the message IDs in a database managed by the storage system and delete the journal copies.

Depending on the desired implementations, the requested one or more of the in-place e-mails can include blind carbon copy e-mails.

Processor(s) 520 can be configured to execute the method or instructions as described above and be further configured to execute a method or instructions so as to provide a user interface configured to facilitate search of the e-mails, wherein in response to a search request conducted through the user interface the processor can be configured to execute a method or instructions so as to retrieve message IDs associated with the search request; wherein the request to retrieve the one or more of the in-place e-mails from the enterprise architecture is made from ones of the retrieved message IDs associated with selections of ones of the e-mails in the user interface.

Depending on the desired implementation, the user interface can be configured to conduct search of the e-mails by text, wherein the text is searched against the full text index of the in-place e-mails managed in a database of the archive system, the full text index of the in-place e-mails associated with corresponding message IDs.

Depending on the desired implementations, the text can be one or more of a text in a body of the e-mails, a sender, a direct recipient, a carbon copy recipient, or a blind carbon copy recipient.

Depending on the desired implementation, the user interface can be configured to search of the e-mails by file attachment, wherein the file attachment is searched against a full text index of the in-place e-mails managed in a database of the archive system, the full text index of the in-place e-mails associated with corresponding message IDs.

Through the archive system described herein, e-mails can be stored in-place (i.e., at the end user device of virtualized space allocated to the user) without requiring a clone copy. Further, queries can be directed to the archive system instead of the enterprise architecture to conduct analytics, retrieve contents of e-mails based on search parameters, reconstitute e-mails through generation of mock copies of an e-mail received by a user for compliance purposes, or trace where an e-mail is stored without needing to go through the enterprise architecture. Additionally, because there is a full text index of the journal copy, such an archive system can field broader search queries than those available through the enterprise architecture. For example, a search query of "Show me all e-mails regarding 'Project X' send to user Y by blind carbon copy between dates A and B" can be processed by the archive system significantly faster than the enterprise architecture because of the full text index, unique identifier, and the retrievable processing points.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for an archive system for managing an archive of e-mails as in-place e-mails in an enterprise architecture and facilitating retrieval of the in-place e-mails, comprising:

receiving the journal copies of the e-mails directed to the enterprise architecture;

retrieving message identifiers (IDs) from the journal copies of the e-mails for managing the journal copy in a full text index; and in response to a request to retrieve one or more of the in-place e-mails from the enterprise architecture associated with a message ID from the message IDs:

providing the message ID to an application programming interface (API) associated with the enterprise architecture to retrieve a plurality of processing points used by the enterprise architecture to process and trace a history from receipt of the journal copy, to generation of the one or more in-place e-mails for corresponding one or more end user recipients, to delivery of the one or more in-place e-mails to the one or more end user recipients; and providing the retrieved plurality of processing points associated with the requested one or more of the in-place e-mails to the API to retrieve the requested one or more of the in-place e-mails from one or more devices locally storing the one or more of the in-place e-mails on behalf of the one or more end users.

2. The method of claim 1, wherein the one or more devices comprise one or more user devices that manages the one or more of the in-place e-mails.

3. The method of claim 1, further comprising generating the full text index of the journal copies with the message IDs in a database and deleting the journal copies.

4. The method of claim 1, wherein the requested one or more of the in-place e-mails comprises blind carbon copy e-mails.

5. The method of claim 1, further comprising providing a user interface configured to facilitate search of the e-mails, wherein in response to a search request conducted through the user interface, retrieving ones of the message IDs associated with the search request;

wherein the request to retrieve the one or more of the in-place e-mails from the enterprise architecture is made from ones of the retrieved message IDs associated with selections of ones of the e-mails in the user interface.

6. The method of claim 1, wherein the user interface is configured to conduct search of the e-mails by text, wherein the text is searched against the full text index of the in-place e-mails managed in a database of the archive system, the full text index of the in-place e-mails associated with corresponding message IDs.

7. The method of claim 1, wherein the user interface is configured to search the e-mails by file attachment, wherein the file attachment is searched against a full text index of the in-place e-mails managed in a database of the archive system, the full text index of the in-place e-mails associated with corresponding message IDs.

8. The method of claim 1, wherein the journal copies are deleted after generating the full text index and retrieving the message IDs for subsequent use in the request.

9. The method of claim 6, wherein the text is one or more of a text in a body of the e-mails, a sender, a direct recipient, a carbon copy recipient, or a blind carbon copy recipient.

10. An archive system configured to manage an archive of e-mails as in-place e-mails in an enterprise architecture and facilitating retrieval of the in-place e-mails, comprising:

a storage system; and a server connected to the storage system by a network, the server comprising:

a processor, configured to:

receive journal copies of the e-mails directed to the enterprise architecture;

retrieve message identifiers (IDs) from the journal copies of the e-mails for management in a full text index managed by the storage system;

in response to a request to retrieve one or more of the in-place e-mails from the enterprise architecture associated with a message ID from the message IDs:

provide the message ID to an application programming interface (API) associated with the enterprise architecture to retrieve a plurality of processing points used by the enterprise architecture to process and trace a history from receipt of the journal copy, to generation of the one or more in-place e-mails for corresponding one or more end user recipients, to delivery of the one or more in-place e-mails to the one or more end user recipients; and provide the retrieved plurality of processing points associated with the requested one or more of the in-place e-mails to the API to retrieve the requested one or more of the in-place e-mails from one or more devices locally storing the one or more of the in-place e-mails on behalf of the one or more end users.

11. The archive system of claim 10, wherein the one or more devices comprise one or more user devices that manages the one or more of the in-place e-mails.

12. The archive system of claim 10, wherein the processor is configured to generate the full text index of the journal copies with the message IDs in a database managed by the storage system and delete the journal copies.

13. The archive system of claim 10, wherein the requested one or more of the in-place e-mails comprises blind carbon copy e-mails.

14. The archive system of claim 10, wherein the processor is further configured to provide a user interface configured to facilitate search of the e-mails, wherein in response to a search request conducted through the user interface the processor is configured to retrieve message IDs associated with the search request;

wherein the request to retrieve the one or more of the in-place e-mails from the enterprise architecture is made from ones of the retrieved message IDs associated with selections of ones of the e-mails in the user interface.

15. The archive system of claim 10, wherein the user interface is configured to conduct search of the e-mails by text, wherein the text is searched against the full text index of the in-place e-mails managed in a database of the archive system, the full text index of the in-place e-mails associated with corresponding message IDs.

16. The archive system of claim 10, wherein the user interface is configured to search the e-mails by file attachment, wherein the file attachment is searched against a full text index of the in-place e-mails managed in a database of the archive system, the full text index of the in-place e-mails associated with corresponding message IDs.

17. The archive system of claim 10, wherein the processor is configured to delete the journal copies after the full text index is generated and the message IDs are retrieved for subsequent use in the request.

18. The archive system of claim 15, wherein the text is one or more of a text in a body of the e-mails, a sender, a direct recipient, a carbon copy recipient, or a blind carbon copy recipient.

\* \* \* \* \*